(12) United States Patent
Ben-Shalom et al.

(10) Patent No.: US 8,913,018 B2
(45) Date of Patent: Dec. 16, 2014

(54) SYSTEM AND METHOD FOR FINGER RESOLUTION IN TOUCH SCREENS

(75) Inventors: Itamar Ben-Shalom, Meitar (IL); Gadi Garfinkel, Yehud (IL); Arthur Gershfeld, Akko (IL)

(73) Assignee: N-trig Ltd., Kfar-Saba (IL)

( * ) Notice: Subject to any disclaimer, the term of this patent is extended or adjusted under 35 U.S.C. 154(b) by 767 days.

(21) Appl. No.: 13/163,917

(22) Filed: Jun. 20, 2011

(65) Prior Publication Data

US 2011/0310040 A1 Dec. 22, 2011

Related U.S. Application Data

(60) Provisional application No. 61/356,689, filed on Jun. 21, 2010.

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01); *G06F 2203/04104* (2013.01)
USPC ........................................ 345/173; 178/18.01

(58) Field of Classification Search
CPC ........ G06F 3/041; G06F 3/044; G06F 3/0418
USPC ................. 345/173–175; 178/18.01
See application file for complete search history.

(56) References Cited

U.S. PATENT DOCUMENTS

| | | | | |
|---|---|---|---|---|
| 5,675,130 A * | 10/1997 | Sekizawa | ................. | 178/18.07 |
| 5,825,352 A * | 10/1998 | Bisset et al. | ................. | 345/173 |
| 6,297,811 B1 * | 10/2001 | Kent et al. | ................. | 345/173 |
| 6,492,979 B1 * | 12/2002 | Kent et al. | ................. | 345/173 |
| 6,573,844 B1 * | 6/2003 | Venolia et al. | ................. | 341/22 |
| 7,352,455 B2 | 4/2008 | Groothuis et al. | | |
| 7,372,455 B2 | 5/2008 | Perski et al. | | |
| 8,692,795 B1 * | 4/2014 | Kremin et al. | ................. | 345/174 |
| 8,797,275 B2 * | 8/2014 | Tsuzaki et al. | ................. | 345/173 |
| 2007/0063981 A1 * | 3/2007 | Galyean et al. | ................. | 345/173 |
| 2007/0152976 A1 * | 7/2007 | Townsend et al. | ................. | 345/173 |

(Continued)

FOREIGN PATENT DOCUMENTS

| | | |
|---|---|---|
| EP | 1717677 | 11/2006 |
| WO | WO 2005/114369 | 12/2005 |
| WO | WO 2009/108334 | 9/2009 |
| WO | WO 2011/161673 | 12/2011 |

OTHER PUBLICATIONS

Communication Relating to the Results of the Partial International Search Dated Feb. 10, 2012 From the International Searching Authority Re. Application No. PCT/IL2011/000489.

(Continued)

*Primary Examiner* — Matthew Fry

(57) ABSTRACT

System and methods for determining multiple interactions with a digitizer sensor are provided. Entries in a matrix may be provided based on measured and reference values associated with junctions in a digitizer sensor. An entry associated with at least two extreme values related to respective at least to dimensions of the digitizer sensor may be located. A junction associated with the located entry may be designated as an interaction point. In some embodiments, one or more interactions may be determined using a topographical-like evaluation of interactions.

8 Claims, 8 Drawing Sheets

(56) References Cited

U.S. PATENT DOCUMENTS

| | | | |
|---|---|---|---|
| 2007/0285404 A1* | 12/2007 | Rimon et al. | 345/173 |
| 2008/0187178 A1* | 8/2008 | Shamaie | 382/103 |
| 2008/0305836 A1* | 12/2008 | Kim et al. | 455/564 |
| 2008/0309629 A1 | 12/2008 | Westerman et al. | |
| 2009/0020343 A1* | 1/2009 | Rothkopf et al. | 178/18.05 |
| 2009/0095540 A1* | 4/2009 | Zachut et al. | 178/18.03 |
| 2009/0251438 A1* | 10/2009 | Westerman et al. | 345/174 |
| 2010/0073301 A1* | 3/2010 | Yousefpor et al. | 345/173 |
| 2010/0097328 A1* | 4/2010 | Simmons et al. | 345/173 |
| 2010/0134442 A1* | 6/2010 | Yang et al. | 345/175 |
| 2010/0225604 A1* | 9/2010 | Homma et al. | 345/173 |
| 2010/0283752 A1* | 11/2010 | Maeda | 345/173 |
| 2010/0289754 A1* | 11/2010 | Sleeman et al. | 345/173 |
| 2010/0295810 A1* | 11/2010 | Nagata et al. | 345/173 |
| 2010/0315372 A1* | 12/2010 | Ng | 345/174 |
| 2010/0321321 A1* | 12/2010 | Shenfield et al. | 345/173 |
| 2011/0084934 A1* | 4/2011 | Tsuzaki et al. | 345/174 |
| 2011/0221701 A1* | 9/2011 | Zhang et al. | 345/174 |
| 2011/0291944 A1* | 12/2011 | Simmons et al. | 345/173 |
| 2012/0113017 A1* | 5/2012 | Benko et al. | 345/173 |
| 2013/0106733 A1* | 5/2013 | Wang et al. | 345/173 |
| 2013/0154983 A1* | 6/2013 | Christiansson et al. | 345/173 |
| 2013/0201151 A1* | 8/2013 | Takashima et al. | 345/174 |
| 2013/0207913 A1* | 8/2013 | Takashima et al. | 345/173 |

OTHER PUBLICATIONS

International Search Report and the Written Opinion Dated Apr. 23, 2012 From the International Searching Authority Re. Application No. PCT/IL2011/000489.

International Preliminary Report on Patentability Dated Jan. 10, 2013 From the International Bureau of WIPO Re. Application No. PCT/IL2011/000489.

* cited by examiner

SYSTEM AND METHOD FOR FINGER RESOLUTION IN TOUCH SCREENS

CROSS-REFERENCE TO RELATED APPLICATIONS

This application claims benefit of U.S. Provisional Patent Application No. 61/356,689, filed Jun. 21, 2010, which is incorporated in its entirety herein by reference.

TECHNICAL FIELD

The present invention is related to touch screens. In particular, the present invention is related to a system and method for differentiating or distinguishing between spatially proximate interactions of a user with a touch screen.

BACKGROUND

Touch screens are commonly used as input devices for a variety of products. The usage of touch devices of various kinds is growing sharply due to the emergence of new mobile devices such as Personal Digital Assistants (PDA), tablet PCs and flat panel displays (FPD). Some of these devices use the touch screen as an addition to standard input or output devices, while others are not connected at all to standard keyboards, mice or like input devices, which are deemed to limit their mobility. A stylus or a body part such as one or more fingers touching or hovering over a digitizer sensor may be used to enable user interactions with the underlying computing platform.

As the usage of touch screens increases and the sensor technologies advance, so do the relevant applications. While traditional applications, such as e-mail or web browsing can be well operated using a single touch mechanism, more advanced applications, including, for example, graphic applications, may well benefit from receiving and utilizing simultaneous multiple interactions that may be in the form of simultaneous multiple touches.

In many applications, simultaneous touches by multiple fingers or styli can be used for drawing multiple lines, performing gestures which can initiate operations such as file manipulation, graphic operations etc. The exact recognition of how many interactions, e.g., made by fingers or styli touching the screen, and the locations of such interactions may be crucial for correct and efficient usage of an application, as incorrect recognition may be highly frustrating for a user of the application.

As long as the interactions with a touch screen are well spaced apart from each other, such that there are clear non-touched gaps therebetween, all touches can be univocally detected or identified and used by the underlying system or associated application. However, as the distances between the locations or points of interactions are reduced, e.g., when two or more fingers touching the screen are relatively close to each other, touching each other, or even tightly adjacent to each other, differentiating between the interactions, e.g., determining the number of fingers interacting with a touch screen and/or identifying the touch point of each finger gets more complex. Further, a multiplicity of fingers touching each other can be confused with a larger object or body part which is not usually used for a user interaction, such as a palm or an elbow.

There is thus a need in the art for a system and method for accurately detecting and/or identifying interactions with a touch screen.

BRIEF DESCRIPTION OF THE DRAWINGS

The subject matter regarded as the invention is particularly pointed out and distinctly claimed in the concluding portion of the specification. The disclosure, however, both as to organization and method of operation, together with objects, features and advantages thereof, may best be understood by reference to the following detailed description when read with the accompanied drawings in which:

Figure 1:
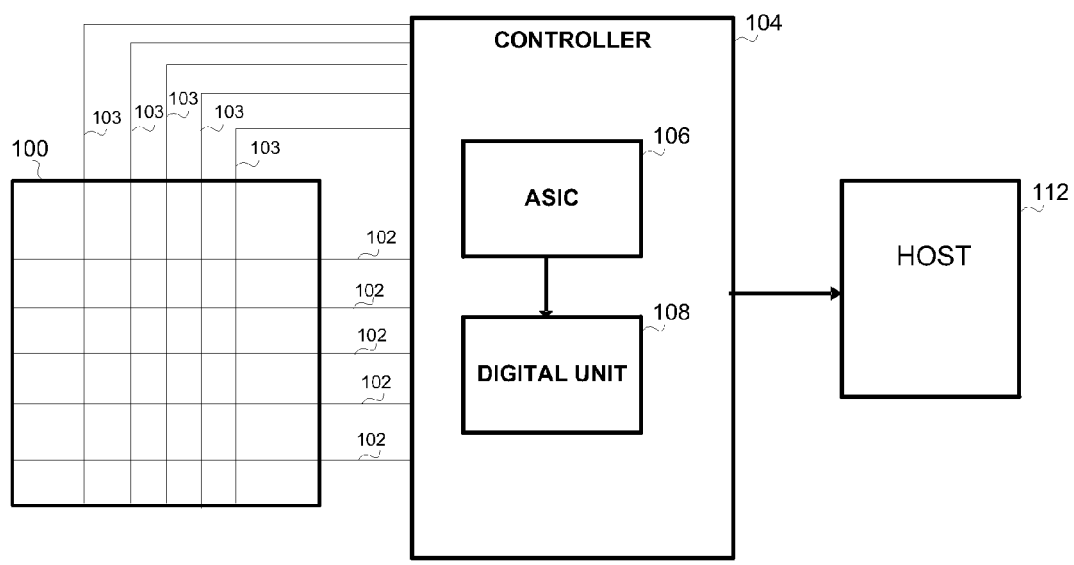
FIG. 1 is a simplified block diagram of a digitizer system according to an exemplary embodiment of the subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, exemplary, non-limiting embodiments of the disclosure incorporating various aspects thereof are described. For purposes of explanation, specific configurations and details are set forth in order to provide a thorough understanding of the embodiments. However, it will also be apparent to one skilled in the art that the present disclosure may be practiced without the specific details presented herein. Furthermore, well-known features may be omitted or simplified in order not to obscure the present disclosure. Features shown in one embodiment may be combined with features shown in other embodiments. Such features are not repeated for clarity of presentation. Furthermore, some unessential features are described in some embodiments.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time. The terms "include", "comprise" and "have" and their conjugates as used herein may mean "including but not necessarily limited to".

The disclosure relates to a substantially transparent sensor, which may be attached to, or constitute a part of, a display and/or an interface associated with a computing platform. The sensor may be interacted with by any object. For example, the sensor may be touched by one or more fingers of a user and/or by one or more styli or other objects. According to embodiments of the invention, one or more styli and/or one or more fingers may be simultaneously used to interact with a single sensor. The sensor, with additional components operative for identifying objects, such as finger and stylus may be referred to herein as a digitizer.

In some embodiments, the sensor may include a grid of horizontal and vertical conductive lines, so that a touch point may be represented by one or more junctions that may be closest to a location touched or hovered by a finger or stylus, or otherwise interacted with. The term "junction" may refer to an area of overlapping or intersection between orthogonal axes in the sensor grid. Accordingly, the term "touched junction" as referred to herein may refer to a junction that is close or closest (with respect to other junctions in a grid) to the point or location of interaction. In some embodiments, other grids of conductive lines may be used. For example, conductive lines may not necessarily be orthogonally arranged in a vertical and horizontal arrangement. For example, conductive lines (and resulting junctions) may be arranged or placed to enable different sensitivities (or junction density) for respective different regions or portions of a touch screen. For the sake of clarity, an arrangement of evenly spaced, vertical and horizontal conductive lines will be described herein. However, it will be realized that embodiments of the disclosure are not limited by the placement or arrangement of conductive lines and/or location or density of junctions or intersections of conductive lines.

In order to detect a touched junction, a signal may be injected into one or more conductive lines parallel to a first axis, e.g., conductive lines positioned or placed parallel to a horizontal axis and a signal may be measured or monitored on conductive lines positioned, located or placed parallel to the first axis or to a perpendicular axis, e.g., the vertical axis, and vice versa. The vertical and horizontal conductive lines may not be in direct touch with each other; therefore a junction may relate to an area of overlapping rather than intersection between the vertical and horizontal conductive lines, and capacitive coupling may be formed between the conductive lines at each junction or intersection.

Placing a finger or object on or close to the sensor at or near a junction or intersection of two perpendicular (or otherwise overlapping or crossing) conductive lines may change the capacitance between each of the conductive lines and the ground. The varied capacitance may change the impedance driven by the injection point, which in turn may increase the driven current and/or effect the voltage change across the junction. Thus, a voltage level measured at an end (or output) of one of the conductive lines may be changed relatively to the level measured when the finger or object is not present near or at the junction Telling apart a stylus from a finger may be accomplished by their physical behavior and interaction with the sensor. For example, the stylus and fingers may operate in different signals, frequencies, amplitudes, phases, or the like. In addition, using a stylus may cause an increased signal to be measured at the conductive line, while a finger may decrease the signal. It will be appreciated that embodiments of the disclosure described herein may be applicable to detecting multiple interactions at multiple touch or hover points that may be related to, or caused by a number of fingers, a number of styli or any combination of any objects.

Typically, when an interaction is detected, it may be required to determine how many fingers (or objects) touched the screen. In particular, when two or more interacting objects (e.g., fingers or styli) are closely proximate to each other, touch each other, or are adjacent to each other, it may be required to discriminate between the interactions of each object, differentiate or discern differences between interactions (e.g., location or strength or functionality), or otherwise distinguish or tell apart interactions.

In particular, it may be required to determine the touch or hover point of each finger or interacting object. Since a finger may typically be larger than the space between two adjacent (possibly parallel) conductive lines, a single finger may typically touch, or have an effect on, a number of junctions. Therefore, in some embodiments, the touch point to be detected or determined may refer to the point most affected by the finger. It will be appreciated that a most affected point may not necessarily be a junction, but may be located between junctions. However, the junction closest to the most affected area may be referred to as, or associated with, the touch point. Alternatively, the touch point may be deduced by approximation or by interpolation of multiple affected junctions.

The term relative magnitude (RM) used herein relates to the ratio between a voltage level measured in association with a junction of conductive lines in a sensor when the junction is touched or interacted with, and a voltage level measured in association with the junction when the junction is untouched or otherwise not interacted with. For example, when a signal having a 1 Volt amplitude is injected to a conductive line, a voltage of 0.9 Volt may be measured in association with a junction of a sensor when no object is touching the junction, present near the junction or when the junction is otherwise not interacted with. A voltage of 0.78 Volt may be measured at the junction when the junction is interacted with, e.g., a finger of a user touches a location that is right above the junction. In such case, an RM value of the junction may be computed by 0.78/0.9=0.867. It will be understood that the accuracy with which an RM value (or any other value) is measured, calculated or otherwise determined may change according to a required accuracy, and that embodiments of the disclosure are not limited with respect to an accuracy of a calculation as described herein.

An interaction threshold value as referred to herein may be a threshold value used for detecting and/or determining an interaction. For example, values measured at, or with respect to junctions in a sensor grid may be compared, or otherwise processed against an interaction threshold value that may be a predefined value or a value calculated in real-time. Generally, an interaction threshold value may be set such that values lower than the threshold may indicate that an interaction may be detected, determined or suspected, while values higher than the threshold, may indicate no such interaction. It will be appreciated by a person skilled in the art that the definition can be reversed, so that higher values are associated with touch or interaction while lower values are not. For example, an interaction threshold may be determined based on attributes or parameters of a sensor grid, conductive lines, stylus or other relevant aspects, as threshold voltage to which a voltage measured at a junction in a sensor grid may be compared and, if the measured voltage is above the threshold value, an interaction may be determined or suspected.

In some embodiments, a threshold value may be determined based on a set of measured values. For example, an average or other value related to a set of measurements in a sensor grid may be used to define a threshold value, and junctions for which a value lower than the average value is measured may be treated as possible interaction points. An interaction threshold may be related to a specific interaction. For example, a specific interaction threshold or interaction threshold value may be defined and/or calculated for a finger, a palm, a stylus or any other object used for interaction. An interaction threshold (and/or value) may be calculated or computed based on any one or more parameters. For example, an interaction threshold value may be a relative value or quantity, a ratio, a percentage or any other calculated, estimated or computed parameter or value.

A finger threshold (FTH) as referred to herein may refer to a relative magnitude threshold calculated for a junction, such that for values under the FTH a junction may be considered to be touched or otherwise interacted with by a finger or another body part. A point most affected by a finger touch may be determined by determining the junction whose RM value may be the lowest with respect to neighboring junctions or with respect to other junctions affected by the finger or interaction. A region touched or interacted with may be identified by identifying (e.g., in an RM matrix described herein) a set of neighboring junctions associated with RM values which are lower than a level or value, e.g., lower than a defined FTH.

One or more refresh cycles of the digitizer may include applying a signal or an input to a first set of conductive lines in a sensor and measuring a signal or an output at the first or at a second set of conductive lines. For example, after a refresh cycle in which voltage may be applied to a first set of conductive lines, e.g., horizontal conductive lines in a grid and voltage may be measured or determined at, or with respect to, a second set of conductive lines, e.g., the vertical conductive lines in a grid, an RM matrix may be created or populated with values. Each entry of an RM matrix may be associated with a junction in a sensor's grid and may contain a measured relative magnitude (RM) value of the associated junction. Entries in the RM matrix containing RM values that are higher than the FTH may be ignored. If entries containing RM values lower than FTH exist, the process may continue and search for interactions. Refresh cycles (and populating an RM matrix) may be performed at any frequency or number per unit of time such that sensitivity or accuracy parameters, criteria or constraints are met.

Although touching a touch screen with one or more fingers is mainly discussed herein, it will be understood that the discussion herein is applicable to any interaction of any applicable object or objects, e.g., one or more styli or other objects. Optionally, at a first stage, a multiple-finger touch zone may be distinguished from touches by other relatively large objects, such as a palm. In other embodiments, this distinguishing or discriminating can be performed as part of the finger separation solution detailed herein.

Generally, discriminating or distinguishing between interactions may be such that interactions with larger areas of a touch screen will not be detected or identified as an interaction of multiple fingers. For example, a method may identify a touch or interaction of palm or large object with a sensor. Methods for such differentiation are described, for example, in U.S. Patent Application Ser. No. 2009/0095540, titled "Method for palm touch identification in multi-touch digitizing systems", filed on Oct. 6, 2008, the contents of which are incorporated herein by reference. Once it is determined that the touched zone is suspected to include multiple finger touches or multiple interactions, it may be required to discern the number of fingers or interaction objects, differentiate and separate between them, and/or identify the location of each interaction.

According to some embodiments of the disclosed subject matter, in order to separate between adjacent or close fingers interacting with a digitizer, and to determine parameters related to an interaction, e.g., identify an object interacting with a sensor or differentiate between interacting fingers or objects, RM minima may be searched for in an RM matrix. A conductive line in a grid may intersect or overlap with a number of other conductive lines. Accordingly, a conductive line may be associated with a number of junctions. A set of RM values related to junctions associated with a conducting line may be observed and one or more minima may be identified.

In some embodiments, a touch point may be identified by identifying a junction that is associated with a first minimum RM value with respect to a first set of RM values associated with junctions along, or associated with, a first conductive line, and a second minimum RM value with respect to a second set of RM values associated with junctions along, or associated with, a second conductive line that intersects or overlaps the first conductive line at the identified junction. For example, a touch point may be identified or determined by identifying minima RM values along both horizontal and vertical conductive lines at the same junction. It will be appreciated that due to measurement deviations, rounding, or the like, the minima along two or more conductive lines may not be the exact same junction but rather adjacent, diagonal, or other nearby junctions. The discussion below can be easily extended to relate to such cases. In addition, each blob (e.g., group of junctions) that is suspected to be touched by a palm or by multiple fingers may be associated with a minimal RM. In some embodiments, at a first stage, large areas may be detected, followed by performing finger separation in each area.

Generally, junctions associated with minimum RM values over two or more axes may be identified as touch or interaction points. However, since the interaction point is not necessarily a junction, additional junctions associated with RM values below FTH may also be associated with touch points.

Various methods may be employed in order to identify and/or characterize a number of extreme values in a matrix that may be associated with an RM matrix. In one embodiment, in order to identify minima along a vector of values (e.g., values associated with junctions along a conductive line), a method as described herein may be used. According to embodiments of the invention, a minimal distance threshold (MDT) may be defined. An MDT may be a minimal difference that may be required to exist between a value associated with potential minimal point and a value associated with another point at either side of the potential minimal point in order for the potential minimal point to represent a minimum.

The MDT can be defined in percentage of the minimal value. For example, the MDT can be defined as three percent (3%) of the potential minimal point's value. In other embodiments, an MDT may be a predefined absolute or other value.

In some embodiments, groups of continuous or neighboring junctions associated with an RM value below the FTH may be identified. For example, a group may be associated with junctions along one horizontal or vertical line. A value higher than the FTH, for example 1, may be added at the beginning and end of each group.

Junctions of a group (e.g., junctions along a conductive line) may be scanned, e.g., according to their original order along the conductive line, starting from either direction. A minimum may be located, e.g., a junction i having an RM value of v that may be lower from all values previously observed in the group, wherein the RM value of the junction following junction i may be higher than v.

Values of the points following i may be examined in a search for a junction j whose RM value p may be higher than v by at least the predetermined MDT, e.g., the value p may be at least a predetermined percentage above v. If a junction m whose RM value q is lower than v is encountered before reaching junction j as described herein, than the value q associated with junction m may be denoted as the minimum detected value, and junction m may be designated as the potential minimal point or junction.

Once a junction j is detected, the junction whose RM value is minimal may be stored, and the RM value of junction j may be set to higher value than FTH, e.g. 1 instead of p. It will be appreciated that junction j may always be detected, since a value above FTH, e.g. 1 may have been placed at the end of the group. The process may continue with examining junctions following j. If an artificial minimum was created by setting p to have value above FTH, e.g. 1, it may be ignored. Accordingly, it may be verified that each minimum is surrounded by higher, original RM values, namely, RM values calculated based on values measured for junctions of a grid.

According to other embodiments of the disclosed subject matter, in order to separate between adjacent or close fingers interacting with a digitizer, an interaction may be detected based on topographical-like evaluation of RM values of regions or areas on a display or an associated digitizer sensor. For example, interactions with a display may be identified, recognized, separated, categorized, characterized or distinguished based on identifying one or more regions associated with one or more interactions. In some embodiments, by observing values in an RM matrix, one or more regions on a display with which an interaction is associated may be identified. For example, a threshold may be defined and a group of entries in an RM matrix associated with values lower than the threshold may be identified as an interaction by an object of any size. For example and as described herein, interactions with a stylus, finger, hand, palm or others may be identified by comparing values of entries in an RM matrix to a threshold.

An iterative process may be used. For example, an iterative process may include defining a first threshold and identifying a first set of entries in an RM matrix, the first set associated with entries having values lower than the first threshold. Then, a second threshold, which may be lower than the first threshold, may be defined and a second set of entries in the RM matrix may be identified, the second set associated with values lower than the second threshold, and so on. The second threshold may or may not be based on the identified first set of entries.

In some cases, a second group of entries in an RM matrix identified in a second iteration may be a subset of entries identified in a previous iteration. Additional iterations associated with further (possibly different) thresholds may be performed to further identify smaller groups of entries, until all junctions suspected as associated with interactions have either disappeared (e.g., ignored) or have been identified as finger touches, or until another stopping criteria has been met.

The interactions identified by the iterations may be visually or conceptually viewed as contour lines on a topographic map of areas below sea level, wherein a contour line associated with a lower threshold encircles areas which are internal to areas associated with higher thresholds. Thus, repeatedly lowering the threshold may provide for identifying smaller and smaller areas.

The accuracy, resolution or precision with which an interaction is identified, categorized, characterized or distinguished may be configurable. For example, by defining a maximal number of iterations, a method of determining a threshold, or a minimal size of a region detected, embodiments of the invention may enable configurable detection resolution. For example, in one embodiment, an iterative process may be repeated until regions having a size or shape not exceeding a predetermined maximal size or shape (e.g., a region sized and shaped as a finger touch) are identified. The iterative process may then be terminated upon determining that all regions associated with an interaction are smaller than a predefined area. In another embodiment, the number of iterations may be limited or predefined, such that upon performing a predefined number of iterations the process may be terminated. Upon terminating an iterative process, an indication of an interaction may be provided. For example, an indication may include the location, size or other parameters related to one or more detected interactions.

A threshold associated with each iteration may be dynamically defined or set. For example, a threshold defined for a first iteration may be predefined. However, a threshold for subsequent iterations may be defined based on various, possibly dynamic, parameters. For example, a threshold used in a given iteration may be set according to values or criteria associated with entries identified in a previous iteration. For example, a group of entries in an RM matrix may be identified or recorded on a first iteration (e.g., marked or recorded as suspected to indicate an interaction). A threshold to be used in the second, next or subsequent iteration may be defined by observing values associated with the group identified in the first iteration, and defining a threshold to be used in a subsequent iteration to be a portion of such value. For example, an average value may be calculated based on values associated with entries identified in the first iteration, and a threshold used in a second iteration may be defined to be 85% of such average value.

The following is a detailed description of an exemplary method and a computing environment in which the disclosed subject matter may be used. A digitizer system for identifying finger (or other) touches or interactions may be implemented in a variety of methods. A digitizer sensor and such methods, including simultaneously identifying styli interactions and/or multiple finger touches or interactions is described in detail in U.S. Pat. No. 7,372,455 filed on Jan. 15, 2004, incorporated herein by reference in its entirety.

Reference is now made to FIG. 1 showing an exemplary simplified block diagram of a digitizer system in accordance with some embodiments of the present invention. As shown, the system may include a digitizer sensor 100, a controller 104 comprising one or more application-specific integrated circuits (ASIC) 106 and one or more digital units 108. As further shown, the system may be connected to a host 112.

The preferred platform for the present invention may be or may include a transparent digitizer for a computing device that uses a flat panel display (FPD) screen. The computing device may be any device that enables interactions between a user and/or an object and the device. Examples of such devices include tablet PCs, pen enabled lap-top computers, navigation devices, entertainment devices, personal digital assistants (PDAs) or any fixed or hand held devices such as palm pilots or mobile phones. According to some embodiments of the present invention, the digitizer system may include a grid-based digitizer sensor 100, which is optionally transparent, and which is typically overlaid over or within an FPD, such as liquid crystal display (LCD). It will be understood that other arrangements or grids may be used.

According to some embodiments of the disclosure, a sensor array may be manufactured on a substrate, which may typically be a transparent material such as glass or polymer material, such as polyethylene terephthalate (PET). In some embodiments, the sensor may include two transparent PET foils, each patterned with conductive lines. Optionally, conductive lines 102 and 103 are made of ITO or other transparent conductors, such as: FTO, AZO etc. The transparent substrates may be combined to create a grid of conductive lines 102 and 103. In other embodiments, the sensor array may include a transparent glass substrate patterned on one side with horizontal conductive lines as shown by 102 and on the other side with vertical conductive lines as shown by 103. In other embodiments of a glass substrate, horizontal conductive lines 102 and vertical conductive lines 103 may be patterned on the same side of the glass substrate. In order for capacitive coupling to be generated between horizontal conductive lines 102 and vertical conductive lines 103, no direct contact is formed between the horizontal and vertical lines, e.g., they may be isolated from each other. In the case of one-sided patterned glass substrate, in each junction between a horizontal conductor and a vertical conductor, either the horizontal or the vertical conductor may be patterned with a jumper or a "bridge" to the other conductor, thus isolating them from one another.

Optionally, a protective layer is used on top of the substrate or substrates and conductors for protecting the sensor. Conductive lines 102 and 103 may be connected to controller 104. It will be appreciated that the present invention is not limited to the described sensor configurations, but any other sensor configurations can be used.

Controller 104, optionally included in, or mounted on, a printed circuit board (PCB), may include an ASIC 106. ASIC 106 may include circuitry configured to provide input to the conductive lines and process and sample analog output from the conductive lines (or attached components) into a digital representation. Typically ASIC 106 includes both analog and digital components. According to some embodiments of the present invention, digital signal related to input received from grid 100 may be forwarded to a digital unit 108, that may be any computing device, controller or article. In some embodiments, digital unit 108 may include a storage article such as a computer or processor readable medium, or a computer or processor storage medium, such as for example a memory, a disk drive, or a USB flash memory, encoding, including or storing instructions, e.g., computer-executable instructions, which when executed by a processor or controller included in digital unit 108, carry out methods disclosed herein. Some embodiments may be provided in a computer program product that may include a non-transitory machine-readable medium, having stored thereon instructions, which may be used to program a computer, or other programmable devices, to perform methods as disclosed above. For example, digital unit 108 may include such non-transitory machine-readable medium, instructions and programmable devices. Accordingly, any operation performed by host 112 as described herein may be performed by digital unit 108. In other embodiments, digital unit 108 may be or may include a digital ASIC unit, for further digital processing. An output, result or outcome provided by digital processing performed by digital unit 108 may typically include one or more positions or locations of an interaction with a touch screen associated with grid 100. For example, a location of a user input or interaction, e.g., a touch of one or more styli and/or multiple finger tips, palms or other objects or body parts. The output, result or outcome may comprise additional parameters or levels, such as an indication of the pressure exerted by the user on the sensor, data related to usage of a stylus such as buttons, or the like.

An output of controller 104 may be provided to a host computer 112 via an appropriate interface for processing by an operating system or any application running on host 112.

ASIC unit 106 may be connected to one or more ends of conductive lines 102 and 103 in grid sensor 100 and may input signals thereto or process received signals. In some embodiments, ASIC unit 106 may include an array of differential amplifiers to amplify the sensor's signals. However, the differential amplifiers are not necessarily used as such, and one input of one or more amplifiers may be grounded or connected to a reference voltage such as the ground.

ASIC unit 106 may include one or more filters to remove irrelevant frequencies. A signal produced by sensor 100 may be sampled by an Analog to Digital Converter (A/D), filtered by a digital filter and forwarded to digital component of ASIC unit 106, for further digital processing.

According to some embodiments of the invention, digital unit 108 may receive sampled data (e.g., sampled output of grid 100), processes it and determine properties of the interaction, such as the positions or locations of an interaction of objects with respect to grid 100, e.g., a touch of a touch screen by one or more styli and/or fingers, or force exerted by the object on the sensor. In case a stylus is used, additional properties can be determined, such as stylus state, color or the like. The calculated position or location may be sent to host computer 112. According to some embodiments, digital unit 108 may produce and manage a triggering pulse associated with at least one conductive line of any of conductive lines 102 or 103 for finger touch detection. Alternatively or additionally, a location of the interaction may be determined.

Figure 2A:
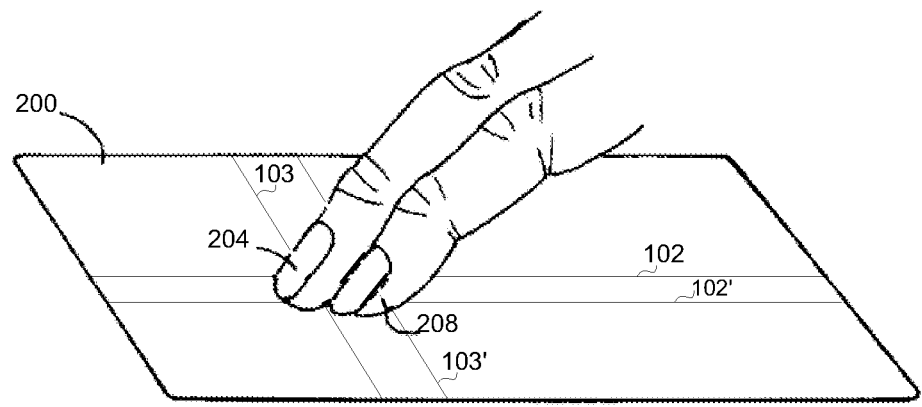
FIG. 2A is a schematic illustration of a digitizer sensor touched by two fingers according to an exemplary embodiment of the present subject matter.

Reference is now made to FIG. 2A, showing a schematic illustration of two fingers 204 and 208 touching a sensor 200. The sensor may include a grid of conductive lines out of which two exemplary horizontal conductive lines 102 and 102', and two exemplary vertical conductive lines 103 and 103 are shown. As shown, fingers 204 and 208 may be adjacent or close to each other and may be placed in the vicinity of the four junctions formed by horizontal lines 102, 102' and vertical lines 103, 103'. A reference value (that may be measured and/or determined when sensor 200 is known to be associated with no interaction) may be stored for each junction. The reference values may be determined by injecting a signal to horizontal lines and measuring output signals at vertical lines when no finger or other object touches or hovers above the sensor, or vice versa. In alternative embodiments, the reference values may be determined by injecting a signal to lines, e.g., horizontal lines, and measuring output signals at the same lines, when no finger or other object touches or hovers above the sensor. The signals can be injected to and measured at horizontal and/or vertical lines. The resulting reference value may be stored for each junction.

In operation, a voltage level, value or parameter may be measured for each junction, and a relative magnitude (RM), that may be the ratio between the measured value and the stored reference value may be recorded and/or stored for each junction, for example in an RM matrix. The RM value at or near a junction touched (or close to a location touched) by the user may be different than one (1), since the finger may change the measured voltage, for example reduce it. Junctions not touched by a user or located far from a location touched, may have or be associated with an RM value substantially equal to 1. Some interaction may cause a higher voltage so the interacted junctions (or close to interactions) may have higher values (in such cases, FTH may be different and relating values to the FTH may include recording values higher than the FTH). Accordingly, it will be noted that the method is not restricted to interactions that reduce voltage.

Figure 2B:
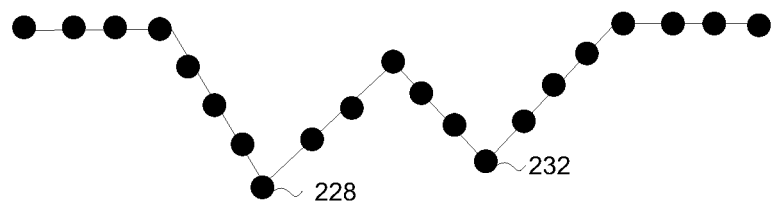
FIG. 2B shows a plot of output values produced by a system according to embodiments of the subject matter.

Referring now to FIG. 2B, showing a graph or plot of values associated with a group of junctions of horizontal line 102 and their respective RM values. It will be appreciated that the graph contains points related to junctions between horizontal line 102 and vertical conductive lines not shown in FIG. 2A. It will be also understood that the graph may only include a part of the junctions along line 102, for example, only the values of a consecutive sequence of junctions whose RM values are below the FTH. Point 228 may correspond to the junction of horizontal line 102 with vertical line 103. As shown, this junction may be the most affected point due to a touch by finger 204. Therefore for this junction, the RM value may be lowest, creating a global minimum in the group of junctions, with an RM value below FTH. Point 232 may correspond to the junction of horizontal line 102 and vertical line 103' which may also be considered as touched, but more superficially, therefore it is a local minimum in the group of junctions with RM value below FTH. As shown, this local minimum may not be as low as global minimum 228.

Figure 2C:
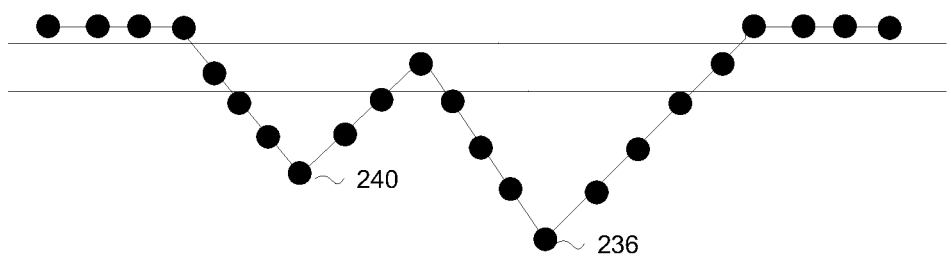
FIG. 2C shows a plot of output values produced by a system according to embodiments of the subject matter.

Referring now to FIG. 2C, showing a plot of RM values of a group of junctions of vertical line 103' and their respective RM values. It will be appreciated that the graph may contain only a part of the junctions of vertical line 103', e.g., a consecutive sequence or set of junctions whose RM values are below the FTH. Point 236 may correspond to the junction of vertical line 103' with horizontal line 102', this junction being the most affected point, due to a touch of finger 208. Therefore, for this junction, the RM is lowest, creating a global minimum in the group of junctions with RM below FTH. Point 240 may correspond to the junction of vertical line 103' and horizontal line 102 which is also affected, but more superficially, therefore, the RM value associated with this junction may be a local minimum in the group of junction RM values below FTH. However, due to the distance of finger 208 from the junction of vertical line 103' and horizontal line 102, as shown, the local minimum value at point 240 is not as low as the one at point 236.

In some embodiments, in order to detect a finger touch, a point associated with a junction may be required to be identified as minimum on both axes. It will be appreciated that the finger threshold (FTH) and the values associated with junctions without any nearby object or finger, which may be referred to as basic values, may be determined during a calibration procedure, may be predetermined, preconfigured or dynamically determined.

Figure 3:
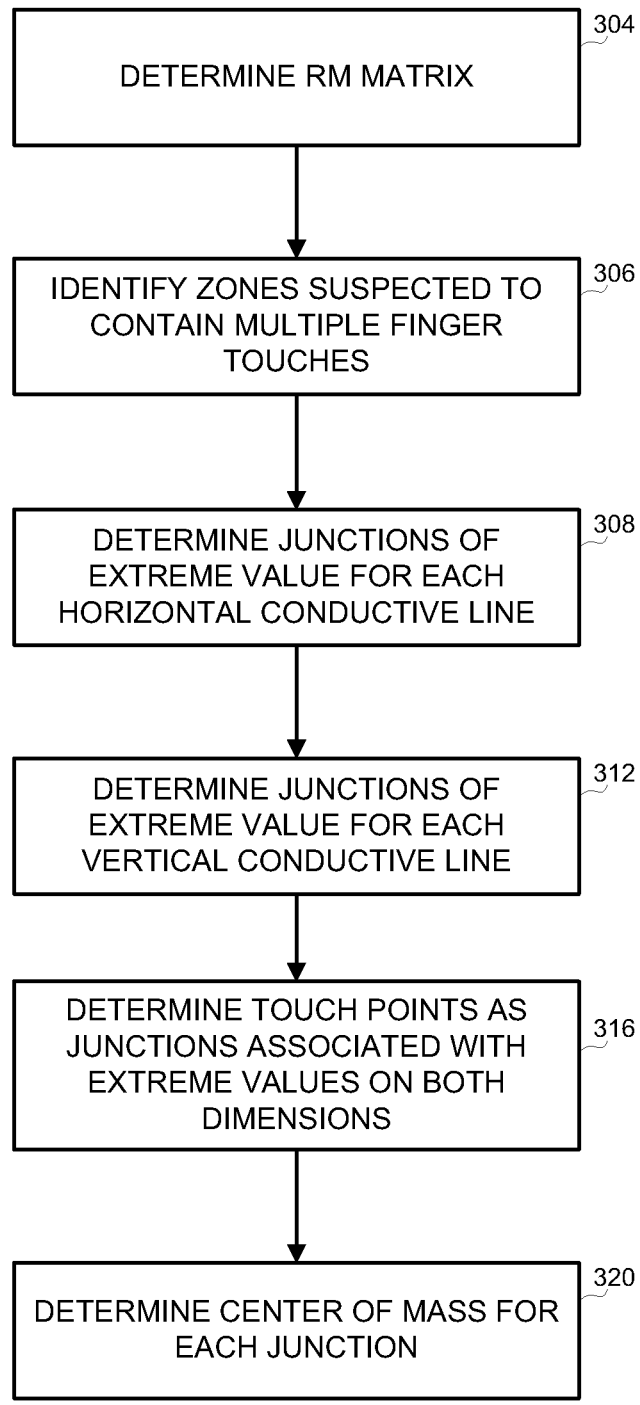
FIG. 3 is a flowchart diagram illustrating a method of determining an interaction location in accordance with the disclosure.

Referring now to FIG. 3, showing a flowchart diagram illustrating a method of determining an interaction location in accordance with the disclosure. The method may include separating, distinguishing or discriminating multiple objects or fingers touches on a touch screen. As shown by block 304, the method may include determining an RM matrix. For example, once a signal has been injected to one or more conductors on a certain direction, and signal measurements have been performed on one or more conductors on the other direction, the RM can be determined for junctions of the digitizer sensor, and an RM matrix may be generated. Each entry in the RM matrix may represent a ratio between a measured value for a junction corresponding to the entry, and a reference value for the junction that may be measured without a user touching or otherwise interacting with the digitizer sensor. RM values exceeding a predetermined FTH value, e.g., 0.96, may be ignored, and processing may be continued with respect to other values, e.g., values equal to or below 0.96.

As shown by block 306, the method may include identifying zones suspected of being associated with multiple interactions, e.g., multiple finger touches. Zones suspected to contain multiple finger touches may be identified, for example by identifying areas larger than a single finger and smaller than areas not used for interaction, such as a palm or an elbow. In some embodiments, operations shown by blocks 308, 312, 316 and 320 may be performed with relation to areas or regions of a display suspected of being associated with multiple interactions.

As shown by block 308, the method may include determining or identifying junctions associated with extreme values for one or more horizontal conductive lines. For example, junctions associated with a minimal value for a horizontal conductive line may be determined or identified by examining or processing values in the RM matrix corresponding to the respective horizontal conductive line.

Although conductive lines along the vertical and horizontal dimensions of a digitizer sensor are mainly referred to herein, it will be realized that embodiments of the invention are not limited to these axes or directions. For example, identifying junctions associated with extreme values may be performed along one or more diagonal directions in a two dimensional plane defined by a grid of conducting lines in a digitizer sensor. More than one conductive line in one direction may be used. For example, an interaction point may be determined by observing values associated with junctions on a first set of conductive lines in a first direction that may intersect with a second set of conductive lines in a second direction. Accordingly, reference to a single line in each of either a horizontal and vertical directions is made herein for the sake of clarity and simplicity, however, it will be understood that embodiments of the invention may be applicable to any first and second sets of lines, wherein lines in a set may be parallel and may be along or parallel to any direction.

As shown by block 312, the method may include determining or identifying junctions associated with extreme values for one or more vertical conductive lines. For example, junctions associated with a minimal value for a vertical conductive line may be determined or identified by examining or processing values in the RM matrix corresponding to the respective vertical conductive line. As described herein, in some embodiments only values below an FTH are processed. It will be appreciated that operations shown by blocks 308 and 312 may be performed at any required order, or in any interleaved or otherwise mixed manner. As described, lines for which no entry is below the FTH, such as lines not touched by a user may be ignored.

As shown by block 316, the method may include determining touch points based on junctions associated with extreme values on both the vertical and horizontal dimensions. For example, junctions with minimal RM value may be determined as the intersection of the minima identified for a horizontal line and a vertical line. Thus, a junction may be identified as a touch point if its RM value constitutes a minimum in the horizontal line as well as in the vertical line it is associated with. It will be appreciated that it may not be required that a point be a global minimum or a local minimum in both axes, but any combination of local or global minimum may also lead to determining that the junction is associated with touch point.

Although the vertical and horizontal dimensions of a digitizer sensor are mainly referred to herein, it will be realized that embodiments of the invention are not limited to these axes or directions. For example, extreme values of junctions along one or more diagonal directions in a two dimensional plane defined by a grid of conducting lines in a digitizer sensor may be observed in order to determine an interaction point or location.

Touch points may not necessarily occur exactly on junctions, and some deviations may exist, wherein a horizontal minimum and a vertical minimum may not occur on the same junction but on neighboring junctions. In order to overcome such situations, an intersection determination may be expanded to include not only the same junctions but also junctions on the horizontal and vertical lines which are adjacent or close to each other. In other embodiments, all junctions on the same horizontal and vertical lines which are located between the junction having the minimal value, and the junctions whose values exceed the MDT threshold may be considered as points having extreme values.

Although operations described with respect to blocks 308, 312 and 316 refer to minimal values, a reversed implementation may be designed, in which maximal values are determined for at least one of the axis. Accordingly, the term extreme value may relate to minimal as well as maximal values. An extreme value may refer not only to the minimal or maximal value alone but also to directly or indirectly neighboring points.

As shown by block 320, the method may include fine tuning the touch point for each touched area. For example, an exact touch point of each identified finger may be identified or determined based on the touch point and its immediately or non-immediately neighboring junctions. Determining the exact point can take into account the geometric of the determined touch area, or the RM value of each junction determined to be in the touched area. For example, the touch point can be determined as the center of mass of the touch area.

Figure 4:
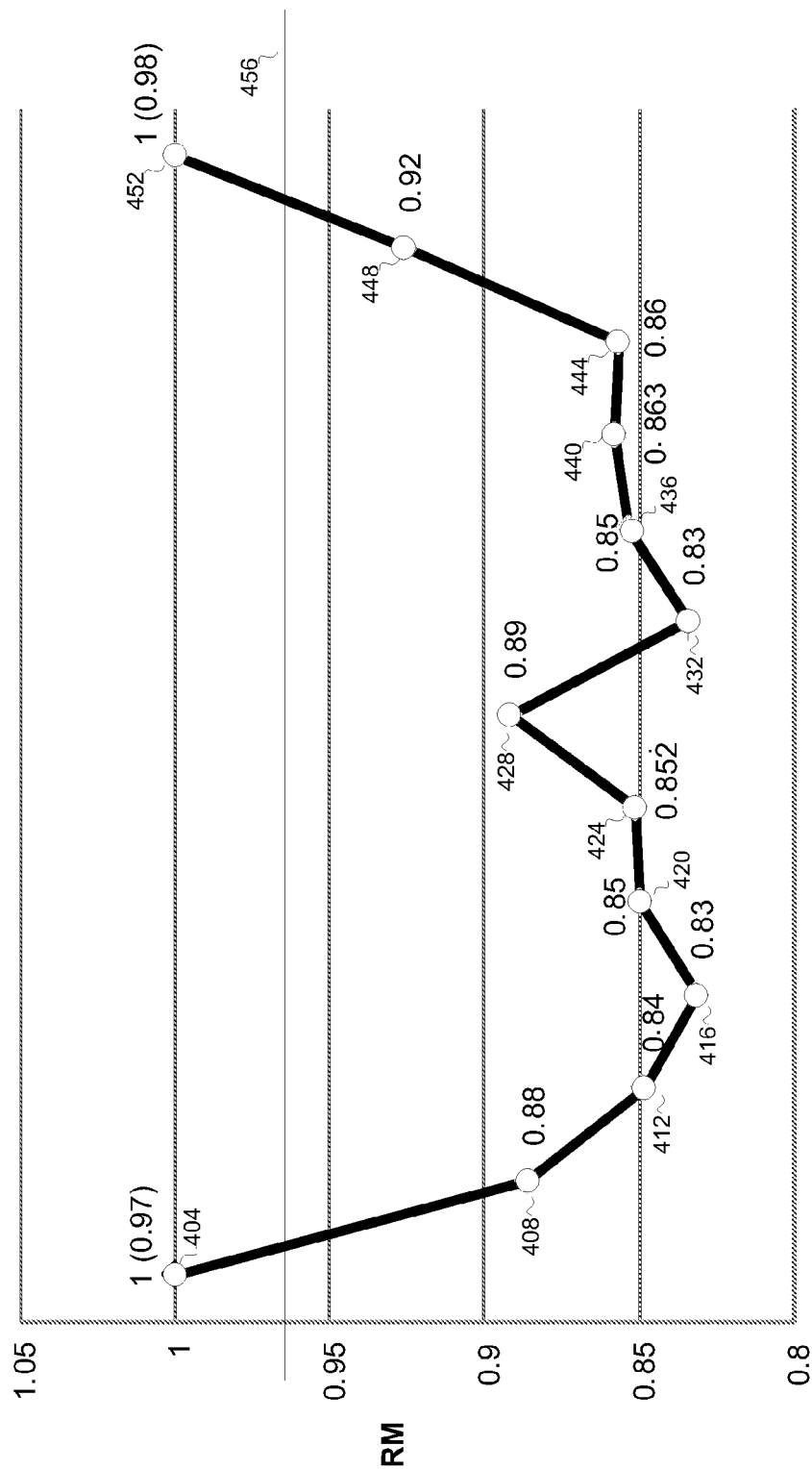
FIG. 4 is a schematic illustration of a graph used for determining a minimum in a set of output values produced by a system according to embodiments of the subject matter.
Figure 5:
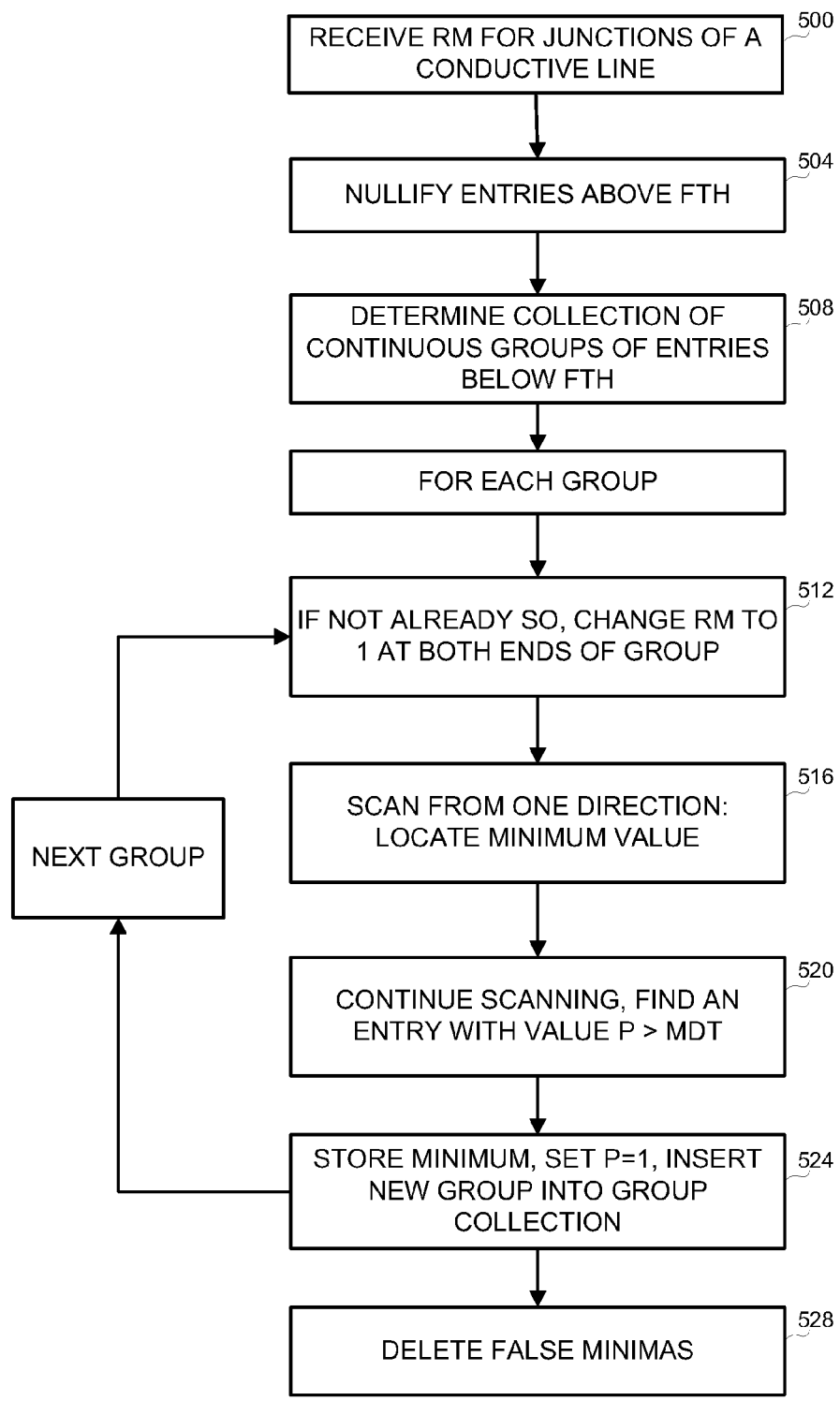
FIG. 5 is a flowchart diagram illustrating a method of determining a location of a minimum in a set of output values produced by a system according to embodiments of the subject matter.

Reference is now made to FIG. 4 that shows a schematic illustration of a graph used for determining a minimum in a set of output values produced by a system according to embodiments of the disclosed subject matter. In particular, FIG. 4 may be related to RM values associated with junctions along a particular conductive line. Reference is additionally made to FIG. 5 that shows a flowchart diagram illustrating a method of determining a location of a minimum in a set of output values produced by a system according to embodiments of the invention. In particular, FIG. 5 may be related to determining the minima along the graph corresponding to finger touches.

FIGS. 4 and 5 are presented in order to exemplify a method for detecting minima related to a horizontal or a vertical line, e.g., as described with respect to blocks 308 or 312 of FIG. 3. According to the method, entries are searched, which have minimal values and which also have, on both sides, entries having values that are higher by at least a predetermined number or percentage than the minimal value.

As shown by block 500, a method may include receiving RM values for junctions of a conductive line. For example, RM values related to junctions of a particular line may be received by controller 104. As shown by block 504, the method may include ignoring RM values above a predefined or otherwise determined value. For example, entries containing values above the FTH are nullified, e.g., assigned a non-relevant value such as −1. Alternatively, all RM values of all junctions of the sensor may be processed. In some embodiments, all values are copied to a temporary memory location, and manipulated in the temporary location, so that the original values may be retained and may be referred to. The FTH may be set to any value lower than 1, such as 0.96 as shown by line 456 of FIG. 4.

As shown by block 508, the method may include determining or identifying groups of contiguous or neighboring values which are below the FTH. For example, controller 104 may identify a collection comprising one or more groups, wherein each group contains values associated with a continuous sequence of junctions where the values are under the FTH.

As shown by block 512, the method may include asserting that a first and last value in a group is set to a predefined constant. For example, a value of "1" or any other value or constant higher than the FTH is assigned to points at both ends of the group, instead of a null value or any other value that may be assigned to such end points. For example, if an assignment of a value larger than the FTH was not executed in a previous or earlier stage. The constant "1" may be added to both sides of the group such that it doesn't replace the first and last members of the group.

For example, points 404 and 452 in FIG. 4, whose original values may have been above FTH, such as 0.97 and 0.98 respectively, as shown in parentheses, may have been nullified due to their values, and then received the artificial value such as "1", since they are adjacent, or determined to be a start and end points of a sequence of points (or associated junctions) as shown by points 408-448, which may make up a continuous group of points having values below the FTH.

As shown by block 516, the flow may include locating a minimum by scanning a set of points in a direction related to the associated junctions. For example, the values may be scanned or examined in any direction, for example, from left to right, until a junction having a minimal RM value is detected or reached, for example, by determining that the RM values associated with the junctions on the immediate left and right of the current junction have higher RM values. For example, as shown by FIG. 4, when scanning from left to right, a minimum may be found on point 416, having a value of 0.83.

A minimum may be required to be surrounded to the left and to the right, although not necessarily by immediately neighboring junctions, by points having RM values higher than the RM value of the minimum point by at least MDT.

Accordingly, once a minimum has been found, scanning may continue as shown by block 520. The scanning may continue in same direction, until a point having an RM value exceeding the minimum by at least a Minimal Distance Threshold (MDT) is detected or found. The MDT may be defined relatively, e.g., as a percentage of the minimum value, e.g., 103%. For example, with respect to FIG. 4, if in order to define a minimum, a value of at least 1.03 times the minimum value is to be detected, then by calculating 1.03*0.83=0.855 for point 416, point 428 having a value of 0.89 may be detected and, point 416 may be designated or determined as a minimum point or a point associated with a minimum value.

As shown by block 524, the flow may include storing a detected minimum value and setting a value of a detected neighboring point to "1". For example, the minimum value found in junction or point 416 may be stored and the RM value of junction 428 may be set to "1" or any predetermined value used. If a lower minimum is found between point 416 and point 428, then it may be designated as the minimum (thus replacing point 416) and processing related to a minimum point and/or value (e.g., storage of the minimum value and searching for points around the minimum point or value) may be performed with relation to such lower, new minimum. Upon detecting a point associated with a value that is at least greater than the detected minimum (e.g., a point associated with a value that is at least 1.03 times the detected value) a new group may be defined.

For example, the new group may begin at the point delimiting the previous group. For example, as shown by FIG. 4, a first group may include point 404 through point 428, and a second group may begin at point 428 and end at point 452. The new group may be inserted into the collection of groups and may be processed similarly to the processing of the previous group.

For simplicity, the following description relates to points 404, 408 and 412 as points to the left of point 416, while points 420, 424, and 428 are referred to as points to its right. A real minimum may be required to be surrounded on the left and on the right by points associated with high enough values (e.g., 1.03 times the value associated with the minimum point). Surrounding points (or associated junctions) may not necessarily be immediately neighboring, or adjacent to, the minimum point or associated junction.

Accordingly, when a minimum is located, e.g., at point 416, it may optionally be checked or determined whether its value is smaller by at least MDT from at least one point to the right. Such verification may, in some embodiments be omitted since it may be verified, as detailed above, that the RM value of the minimum point is indeed smaller in at least MDT from the RM value of at least one point to its right, and due to the value higher than FTH that was set at the beginning and end of the group. In some embodiments, the MDT may be relative, e.g., it may be a percentage of the minimal value. Thus, for example, since the first point of the group has a value of 0.88, if MDT=1.03, then the minimum should be at most 0.88/1.03=0.854.

Operations shown by blocks 512, 516, 520 and 524 may be repeated for the newly created group, wherein setting a group's delimiters as described with reference 512 may be omitted since they may have already been set. Operations shown by blocks 512, 516, 520 and 524 may be repeated for all groups detected, whether initially identified or being a sub-group of a pre-identified group. Possibly after all groups have been processed, false minima are deleted, (e.g., as detailed in association with FIG. 6 below), and all remaining minima are declared valid. Then minima of all horizontal and vertical lines may be detected and their intersections may be determined as the touch points, e.g., as detailed in association with block 316 of FIG. 3.

Figure 6:
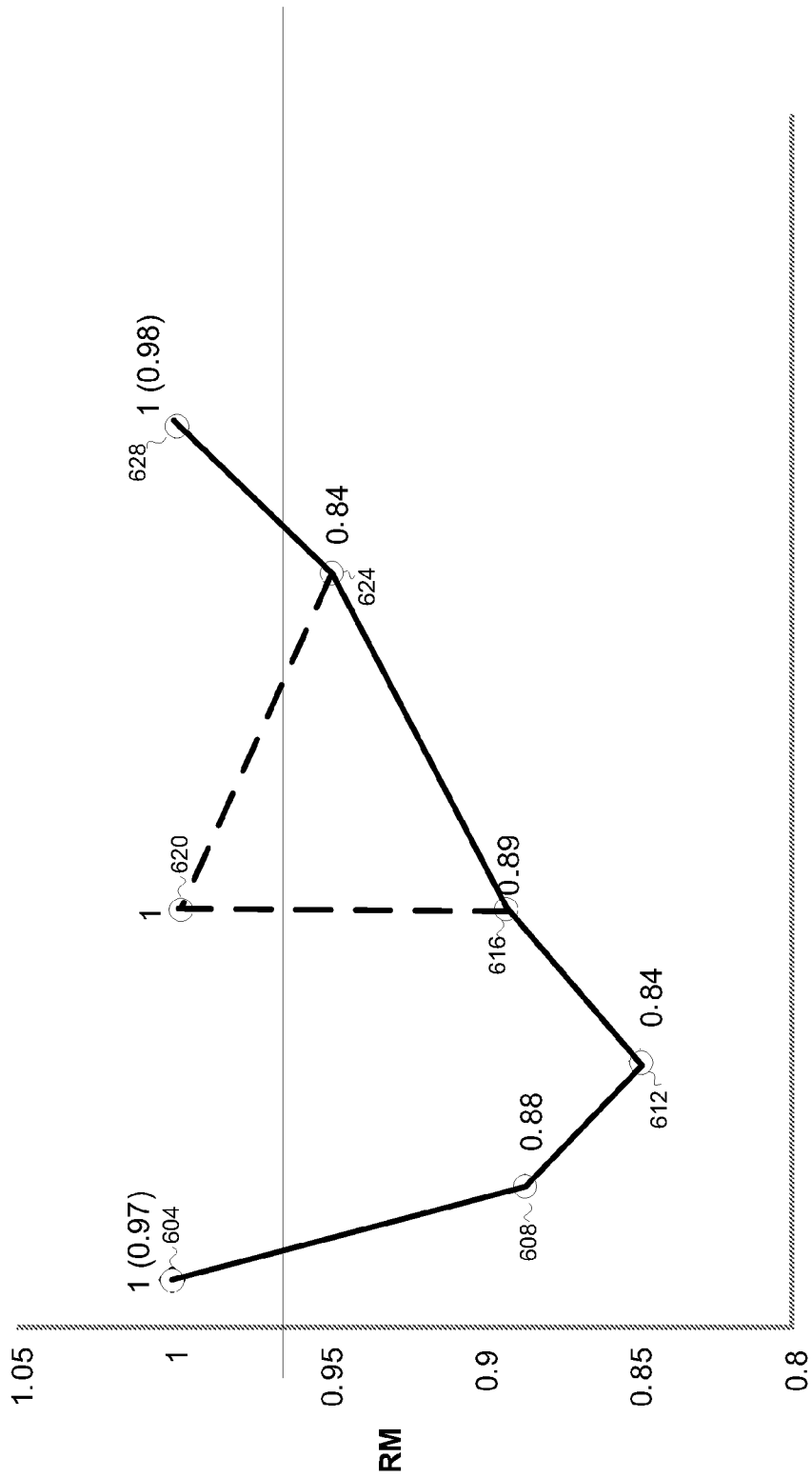
FIG. 6 is a schematic illustration of a graph demonstrating a false minimum according to embodiments of the subject matter.

Reference is now made to FIG. 6 that shows a schematic illustration of a graph demonstrating a false minimum according to embodiments of the disclosed subject matter. Similarly to point 416 in FIG. 4, point 612 may have been identified as minima, and the value of point 616 may have been set to 1, thus allegedly creating conditions for point 624 to be declared as a minimum point. When continuing to search for a minimum in a newly created group (that may consist of points 620 through 628), point 624 may be detected as a minimum, since as shown in the example depicted by FIG. 6, point 624 is surrounded by points whose RM value is higher than the RM value associated with point 624 by an MDT or more. However, point 624 is an artificial minimum, created only because the value of point 620 was set to 1. Therefore, noting that point 620 is an artificially created point or a point assigned an artificial value, the value of point 624 may be compared not against the artificial value assigned to point 620, but against the original value of point 620 being 0.89 as shown. Such comparison to an original value may prevent a point such as point 624 from being identified as a minimum.

It will be appreciated that the measured values can be processed, for example by linear processing such as multiplying by a negative number, so that their relative order is reversed. In such cases the method can be applied in a corresponding reversed manner, including, for example, using a maximum instead of a minimum where applicable in the description herein, e.g., setting a finger threshold which is lower than the value of the junctions searched for, setting an artificial value which is lower than the finger threshold and so on. In such embodiments, the junction whose value is a maximum may be considered as an extreme point. In other embodiments, all junctions on the same horizontal and vertical lines which are located between the junction having the maximal value, with neighbor junctions whose values are below the MDT threshold can be considered as points having extreme values.

Figure 7:
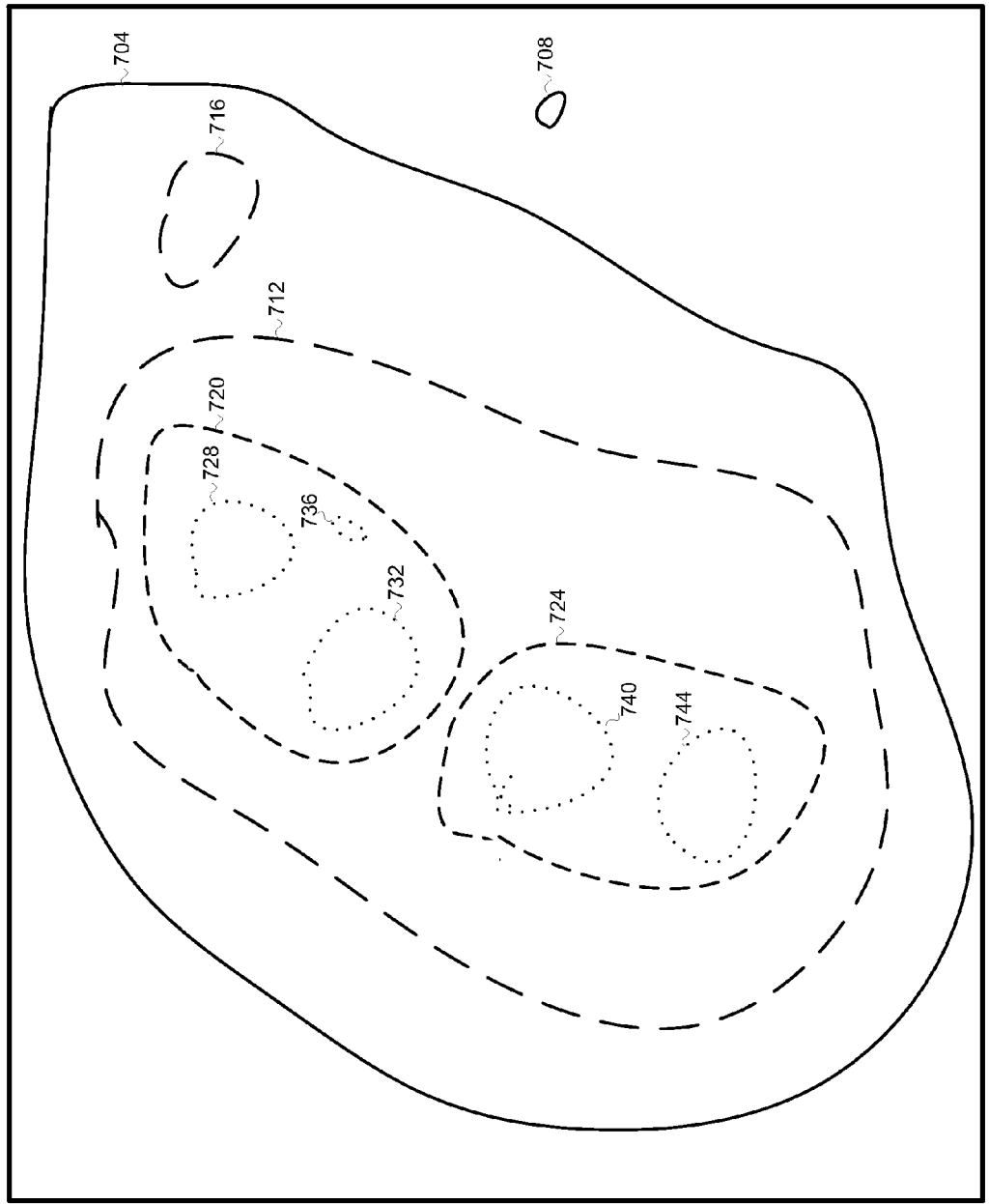
FIG. 7 is a schematic illustration of touch areas and thresholds in accordance with embodiments of the subject matter.
Figure 8:
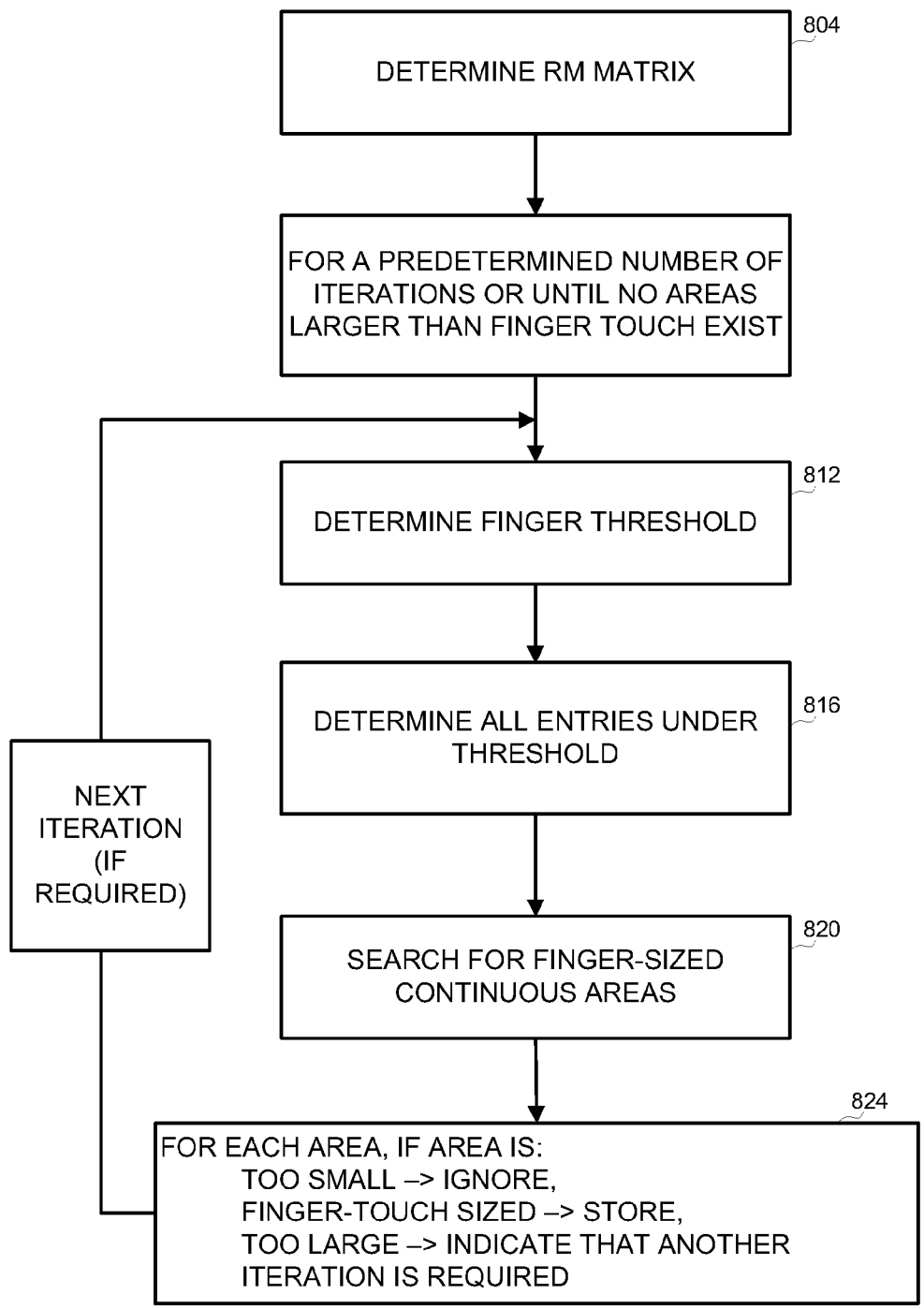
FIG. 8 is a flowchart diagram illustrating a method of determining an interaction location in accordance with embodiments of the subject matter.

Reference is now made to FIG. 7 that schematically shows an illustration of touch areas and thresholds in accordance with embodiments of the disclosed subject matter. Reference is additionally made to FIG. 8 which is a flowchart diagram illustrating a method of determining an interaction location in accordance with embodiments of the invention.

Generally, the flow or method shown and described with reference to FIGS. 7 and 8 is according to an understanding that, in a matrix representing values associated with junctions in a digitizer sensor (e.g., an RM matrix as described above), an RM value smaller than one ("1") may be associated with, or may represent, a junction in the digitizer sensor that is touched with a finger, palm or another object or a junction near a touch or interaction point. However, due to measurement inaccuracies or other effects, untouched junctions may have RM of about 0.99 or even 0.97. Therefore, a smaller threshold such as FTH may be used.

Typically, the closer the contact or interaction point is to a junction, the lower the RM value determined for the junction and hence, the lower the value in an associated RM matrix entry. Thus, when observing an RM matrix, a typical finger touch or stylus interaction may be reflected by entries with low RM values at some junctions, optionally surrounded by entries having higher RM values, further optionally surrounded by entries having yet higher RM values, and further surrounded by areas in which no activity may detected, e.g., entries whose RM values are substantially equal to 1 (or another value representing no interaction). An RM value of "1" or similar to that may represent lack of interaction since the measured value may approximately be the same as the reference value measured when a junction is untouched.

By dynamically or otherwise setting one or more optionally decreasing threshold RM values, embodiments of the invention may identify smaller and smaller areas of interactions of various objects and/or areas touched by different fingers or objects, until interactions sized at most a predetermined size are recognized, even when the fingers are closely adjacent to each other.

As shown by block 804, a method may include determining an RM matrix, similarly to block 304 of FIG. 3 discussed above. As shown by block 806, the method may include performing a number of iterations. For example, the operations described herein may be repeated with different thresholds until all regions where an interaction is identified which may be associated with an object larger than a predefined size are processed. For example, a region size of 0.5"×0.5" may be defined as a threshold region size, and iterations may continue until all areas larger that this region size have been processed.

In some embodiments, an FTH or another threshold used for determining whether an RM value is indicative of an interaction may be modified based on, or correlated with, a size of an identified pattern or group of junctions. Generally, a pattern as referred to herein may be a set or group of junctions in a sensor grid, and may be represented by a set or group of entries in an RM matrix associated with the set or group of junctions where the set of entries share at least one common attribute, e.g., the set of entries are associated with RM values below an FTH. For example, areas 712 and 716 may be patterns that may each be associated with a respective number of junctions and/or related entries in an RM matrix.

According to embodiments of the invention, a first set of patterns may be detected based on a first set of entries in an RM matrix. For example, a pattern may be detected by detecting a set or group of said entries which include, or are associated with, a respective set of values which are smaller than, or are below, a first threshold value. For example, a first set of entries in an RM matrix including values lower than a first FTH may be identified as a first set of patterns. In some embodiments, parts of the set of entries are substantially connected i.e., each entry is neighboring at least another entry in the set. A second set of patterns, included in the first pattern may be detected by defining a second threshold and then examining entries associated with the first set of patterns. For example, based on various parameters related to the first pattern, a second FTH or other threshold may be defined and a second set of patterns, wherein each pattern of the second set is included in a pattern of the first set may be identified. If a second set of patterns and/or an interaction point of at least one discrete object (e.g., an interaction of a single finger or stylus) cannot be identified, one or more areas of the first set of patterns may be identified or indicated as an interaction of a large object, for example, as an interaction of a human palm.

For example, a first FTH, e.g., in a first iteration as described herein, may be set to 0.8 and a set of one or more patterns, e.g., as shown by single pattern 704 may be processed using the first FTH. In a second iteration, a second, smaller FTH of 0.8−0.06=0.74 may be set and so on. By reducing the FTH, junctions that would otherwise be considered as indicative of an interaction may now be excluded or treated as junctions unassociated with an interaction. Accordingly, reducing an FTH may enable higher resolution and increased accuracy in determining exact points of interaction. An FTH may be automatically, dynamically or otherwise set, based on any relevant parameter. For example, the FTH may be set based on a size of a pattern, on the iteration number in an iterative process, on resolution parameters (e.g., number of junctions per unit area in a grid) or on RM value. For example, prior to setting an FTH for processing a pattern, RM values associated with some or all of the junctions associated with the pattern may be examined, a minimum value may be determined, and an FTH may be set according to the detected minimal RM value. For example, determining that the minimal or lowest RM value associated with a set of junctions about to be processed (or associated with a pattern to be processed or examined) is 0.8, an FTH may be set to 0.8+0.05. The value added to a minimal RM value may be predefined, e.g., 0.05 or it may be dynamically or automatically defined. For example, a value added to a minimal RM value as described above may be according to the size of a pattern to be processed, the iteration number in an iterative process, a resolution parameter related to the underlying hardware etc.

As shown by block 812, the method may include determining or defining a finger threshold (FTH). An FTH defined as shown by block 812 may be lower than an FTH used in a previous iteration. The FTH of a first iteration may be set for example to 0.92 or any preconfigured value. According to embodiments of the invention, an FTH or other threshold for determining whether an RM value is associated with, or indicative of, an interaction with a sensor may be dynamic.

As shown by block 816, the method may include detecting or identifying all entries in an RM matrix which are associated with an RM value that is lower than the current FTH. For example, all entries corresponding to junctions that are potentially associated with finger touches may be identified. Since a more intense finger touch may be reflected by lower RM values, reducing the FTH may cause detecting fewer entries associated with RM values under the FTH as compared to a previous iteration, in which a higher FTH may have been used. Accordingly, by reducing the FTH over iterations, embodiments of the invention may determine an interaction location or point with an accuracy or resolution that grows with each iteration.

This is similar to the concept represented by a topographic map of an area below sea level, in which contours associated with less deep altitudes circumscribe smaller contours associated with deeper altitudes, such that the lower the threshold, the smaller and more distinct are the areas it indicates.

As shown by block 820, the method may include searching for continuous areas or regions. For example, continuous areas or regions may be detected by detecting a set of adjacent entries in the RM matrix associated with RM values below the threshold. Such set of adjacent entries in the RM matrix may represent a region in a display that may be associated with a single object (e.g., a single finger touch) or with a number of close or tight together objects, e.g., a number of fingers being held close together. Identifying such regions or areas based on the RM matrix may be performed by various algorithms such as Depth First Search (DFS), Breadth First Search (BFS) or the like.

Searching for continuous areas may include searching for any, possibly predefined region, area size, area shape, pattern or contour that may be of a predefined size, shape or location. Searching for a continuous area (that may indicate an interaction) may include setting an area size threshold to a first (e.g., relatively large) value, searching for a continuous area that is, and, if an area is a continuous area is larger than area size threshold, decreasing the area size threshold value.

Regions, patterns or areas searched as shown by block 820 may be located at various distances from each other or at various relative orientation or positions. For example, a first and second areas detected may be neighboring, i.e., have at least two junctions in common, or they may be diagonally placed with respect to vertical and horizontal axes of a grid, i.e. have one junction in common. In some embodiments, areas placed at any relative proximity to one another, e.g., diagonally or otherwise, may be searched for, identified or detected on a first iteration, e.g., when detecting area 704, while in subsequent iterations, e.g., when processing patterns 712, 720, 724 and so on, only neighboring areas may be identified. By allowing adjacent areas located at any relative direction during a first pass or iteration, embodiments of the invention may enable identifying all or most of the areas that may be associated with an interaction in a first iteration. When allowing only adjacent areas or regions to be identified, a higher resolution may be imposed during iterations other than the first iteration. It will be noted that the number of iterations in which any relative adjacency of detected regions is permitted, may be a configuration parameter or may be dynamically set. For example, based on a pattern size it may be automatically determined whether adjacent regions are identified as possible interaction points or not.

As shown by block 824, the method may include categorizing regions where an interaction was detected and performing an operation according to the categorization. As shown, areas associated with less than a predefined number or arrangement of junctions may be ignored. Some exemplary criteria for ignoring an area are detailed below.

If, however, based on the RM matrix, a recognized region or pattern is of a finger-touch size, it is optionally identified as a finger touch and stored. It will be appreciated that the finger-touch size may relate to a range of sizes, shapes or the like, such that areas that fit within such range are identified as a finger touch and stored.

If under the current FTH a set is detected which is larger than a predefined set of junctions, then another iteration may be performed as shown by the arrow connecting blocks 824 and 812. Accordingly, the process of setting an FTH and detecting an interaction location and size may be repeated. Accordingly, the operations shown by blocks 812, 816, 820 and 824 may be repeated until no more regions indicating an interaction of an object larger than a finger (or any other predefined size object) are detected. For example and referring to FIG. 7, areas 704 and 708 may be identified using the highest FTH, for example 0.97. Area 708 which may be smaller than 3*3 junctions may be ignored, and due to the size of area 704, it may be determined that another iteration is required.

On the next iteration, a lower threshold may be selected, for example 0.95, and the resulting areas may be areas 712 and 716, out of which area 716 may approximately be finger-touch sized and may be determined as a touch area associated with a touch of a finger. Area 712 may be larger than a finger touch (e.g., based on a preconfigured rule or criteria), therefore another iteration may be performed. On the next iteration, the FTH may be lowered, for example to 0.93, and the yielded patterns may be 720 and 724. Areas 720 and 724, both of which may be larger than a finger touch according to the rule, therefore another iteration may be performed. On the next iteration, the threshold may be lowered again, for example to 0.9. Within area 720, three smaller areas may be detected as shown, which include finger touch sized areas 728 and 732, and area 736 which may be determined to be (e.g., by a preconfigured rule) too small and therefore may be discarded or ignored. Areas 728 and 732 may be stored as finger touch areas and/or indications. Recording a finger or other object touch or interaction may include recording any information, e.g., the location of the interaction on a display, shape, size, center, weighted center which takes into account the RM values, or the like. Any information, parameters or data recorded may be provided to a connected host computer. Finger-touch sized areas 740 and 744 may be similarly identified within area 724 recorded and/or reported to a host computer.

The iterations described here may continue until a stopping criterion is met. One stopping criteria may be a determination that no more areas larger than a finger-touch were detected or identified. Another stopping criterion may be reaching a predetermined number of iterations, or the like.

Ignoring a region or a set of adjacent entries in an RM matrix may be according to any parameter, condition, criterion or rule. For example, small sets of points associated with relatively high RM values that may otherwise be identified as possibly indicating an interaction may be ignored in a first iteration. For example, in a first iteration in a flow as shown by area 708 of FIG. 7, small sets or groups of close junctions associated with low RM values (e.g., as reflected in an associated RM matrix) may be ignored. This may be done based on an assumption that small scattered sets may not represent an interaction but rather a spike, an error or other phenomena which should not be confused with interactions of interest.

In another case or embodiment, a set of entries (or associated junctions in a grid or locations on a screen) may be ignored based on a presence of larger groups. For example, if a large group of junctions associated with values indicative of an interaction is identified in a first region, small groups of junctions or single junctions, possibly at a distance smaller or larger than a predefined distance from the large group, may be ignored. Yet another criterion for ignoring sets of junctions that may otherwise be considered as potentially indicative of an interaction may be the number of such sets, possibly within a predefined size area. For example, a large number of small sets of adjacent or single junctions in a relatively small area may be ignored, e.g., based on heuristics that a large number of small groups all within a small area of a display screen are most likely due to some noise and are unrelated to an interaction. As described herein, groups including smaller than a predefined or dynamically determined number of junctions may be ignored. The number of junctions associated with an ignored group may change dynamically and may be set based on any applicable parameter, condition or rule. For example, groups including less than nine (9) junctions which may or may not be arranged in any particular manner, may be ignored on a first iteration, e.g., when large patterns are searched for, and groups including less than four (4) pixels may be ignored in subsequent iterations. Accordingly, the number of junctions associated with an ignored group may be according to a desired resolution.

Yet another example of aspects that may affect the number of junctions associated with ignored groups may be a distance from a large pattern. For example, groups closer to a large pattern may be ignored if they are associated with less than 4 junctions while groups farther from the pattern may be ignored if they are associated with less than 9 junctions.

Yet another exemplary criterion for ignoring a set of junctions may be an RM value. For example, RM values associated with a small group of junctions may be examined and, if the minimal RM value found in the set is above a predefined threshold, the group may be ignored. Accordingly, a group of junctions associated with low RM values that may otherwise be considered as potentially indicating an interaction may be ignored if none of the RM values associated with the group or an average RM value associated with the group is below a predefined or dynamic threshold. For example, the threshold may be set based on the size of the group, a distance from a large group or pattern etc. For example, a set of less than 2×2 junctions may be ignored based on a rule or predefined parameter. For example, it may be determined (e.g., empirically in a lab) that an interaction of a finger may typically or always cause at least a set of 3×3 junctions to be affected. Accordingly, a rule may dictate that sets of less than 3×3 junctions may be ignored. Based on the RM matrix, areas that are substantially of the predetermined arrangement and/or size representing a finger touch, for example, a set of 3×3 junctions, may be identified as finger touches and may be recorded or stored.

Another criterion for accepting or ignoring areas may relate to the relations between the thresholds. For example, a finger may not always affect a 3×3 (or larger) region. Sometimes it may affect 8 junctions and the 9th junction that completes the 3×3 matrix has RM value higher than FTH but lower than the other RM values of the conductive line.

Although not shown in FIG. 8, according to some embodiments, possibly prior to iterating as described herein, a pattern may be identified. For example, some or all entries in an RM matrix associated with values indicative of an interaction may be examined as a whole and a pattern associated with, or represented by, the set of entries may be examined, identified and/or processed. For example, a pattern identified by observing a set of entries in an RM matrix may be identified as, or determined to be, caused by an interaction of a palm. In other embodiments, upon determining a predefined number of iterations in which processing of patterns which decrease in size with each iteration is performed, a remaining pattern may be analyzed and may be identified as an interaction with a palm or other object. In yet other embodiments, failing to identify discrete interactions in a pattern, e.g., failing to identify interactions of a number of fingers after a number of iterations of processing a pattern has been performed, the pattern may be identified as or associated with, an interaction of a palm or other large object, e.g., an object larger than a finger tip or larger than a predefined size.

The FTH values may be reduced or lowered in any required manner, for example in an algebraic series, e.g., each iteration may use a threshold smaller than the previous one by a predetermined amount, a geometric series, e.g., each iteration may use an FTH smaller than the previous one by a predetermined percentage, a predetermined series of numbers, or the like.

It will be appreciated that the method detailed in association with FIG. 7 and FIG. 8 above can also be reversed, such that the relative order between the values will be reversed, and the thresholds will be applied in an ascending order.

It will be appreciated that none of the presented methods interferes with detecting one or more styli used with the digitizer. It will also be appreciated that the disclosed solution can be applied towards detecting multiple styli touch areas, wherein a maximum should be located rather than a minimum.

It should be further understood that the individual features described herein may be combined in all possible combinations and sub-combinations to produce exemplary embodiments of the invention. Furthermore, not all elements described for each embodiment are essential. In many cases such elements are described so as to describe a best mode for carrying out the invention or to form a logical bridge between the essential elements. The examples given above are exemplary in nature and are not intended to limit the scope of the invention which is defined solely by the following claims.

What is claimed is:

1. A method for identifying a plurality of interactions with a digitizer sensor, the method comprising:
    assigning a set of values to a respective a set of entries of a relative magnitude matrix according to a set of measured values, the set of values corresponding to a respective set of junctions in the digitizer sensor, wherein a value corresponding to a junction is calculated based on relating a measured value of the junction to a reference value associated with the junction;
    determining an interaction threshold;
    a. determining a set of entries in the relative magnitude matrix having values above the interaction threshold;
    b. determining at least one subset of entries in the set, the subset associated with a continuous area of the digitizer sensor;
    c. for each of the at least one subset of entries:
        if the continuous area is associated with a predefined arrangement of junctions, indicating the continuous area as an interaction area; and
        if the continuous area is larger than a predefined size, increasing the interaction threshold by an amount and repeating steps a, b and c.

2. The method of claim 1, comprising repeating steps a, b and c until a continuous area having a substantially predefined shape is identified.

3. The method of claim 1, comprising repeating steps a, b and c until a maximal number of iterations has been reached.

4. The method of claim 1, comprising determining the interaction threshold based on the set of values corresponding to the respective set of junctions, and repeating steps a, b and c.

5. The method of claim 1, comprising determining the continuous area is smaller than a predefined size and ignoring the continuous area in a determination of an interaction parameter.

6. The method of claim 1, comprising ignoring the continuous area based on at least one of: values associated with junctions associated with the continuous area, a presence of larger continuous area, a presence of a number of continuous area within a predefined size area and a distance of the continuous area from an identified pattern.

7. A method for identifying a plurality of interactions with a digitizer sensor, the method comprising:
    receiving a set of entries of a relative magnitude matrix according to a set of values, the set of values corresponding to a respective set of junctions in the digitizer sensor, wherein a value corresponding to a junction is calculated based on relating a measured value of the junction to a reference value associated with the junction;
    determining an interaction threshold;
    a. determining a set of entries in the relative magnitude matrix having values below the interaction threshold;
    b. determining at least one subset of entries in the set, the subset associated with a continuous area of the digitizer sensor; and
    c. for each of the at least one subset of entries:
        if the continuous area is associated with a predefined arrangement of junctions, indicating the continuous area as an interaction area; and
        if the continuous area is larger than a predefined size, decreasing the interaction threshold by an amount and repeating steps a, b and c.

8. The method of claim 7, comprising determining the interaction threshold based on the set of values corresponding to the respective set of junctions, and repeating steps a, b and c.

* * * * *